(12) United States Patent
Vaccari

(10) Patent No.: US 12,052,976 B2
(45) Date of Patent: Aug. 6, 2024

(54) CAGE FOR PETS PROVIDED WITH COUPLING ELEMENTS FOR ASSEMBLING GRID WALLS

(71) Applicant: Ferplast S.p.A., Castelgomberto (IT)

(72) Inventor: Nicola Vaccari, Castelgomberto (IT)

(73) Assignee: FERPLAST S.P.A., Castelgomberto (IT)

( * ) Notice: Subject to any disclaimer, the term of this patent is extended or adjusted under 35 U.S.C. 154(b) by 216 days.

(21) Appl. No.: 17/694,186

(22) Filed: Mar. 14, 2022

(65) Prior Publication Data

US 2022/0304274 A1 Sep. 29, 2022

(51) Int. Cl.
*A01K 1/02* (2006.01)

(52) U.S. Cl.
CPC .................. *A01K 1/0245* (2013.01)

(58) Field of Classification Search
CPC .. A01K 1/0245; A01K 1/0272; A01K 1/0281; A01K 1/033; A01K 1/034; F16B 5/008; F16B 5/0614; F16B 5/0052; F16B 5/06; F16B 5/0607; F16B 21/02; B65D 9/24; Y10T 403/44; Y10T 403/217; Y10T 403/443; Y10T 403/218
See application file for complete search history.

(56) References Cited

U.S. PATENT DOCUMENTS

| | | | | |
|---|---|---|---|---|
| 4,757,909 | A * | 7/1988 | Matsuura | B65D 11/1833 220/691 |
| 5,497,728 | A | 3/1996 | Watanabe | |
| 5,549,073 | A * | 8/1996 | Askins | A01K 1/033 119/474 |
| 8,733,293 | B2 * | 5/2014 | Link | F16C 11/04 24/339 |
| 8,955,928 | B2 * | 2/2015 | Cheng | A47B 47/0033 312/265.2 |
| 10,690,162 | B2 * | 6/2020 | Munch-Fals | F16B 5/0614 |
| 11,452,372 | B2 * | 9/2022 | Wei | A47F 3/147 |
| 2002/0117118 | A1 | 8/2002 | Marchioro | |
| 2009/0315008 | A1 * | 12/2009 | Yu | A47D 13/063 256/67 |
| 2016/0215801 | A1 * | 7/2016 | Munch-Fals | F16B 5/0635 |
| 2017/0241456 | A1 * | 8/2017 | Tuthill | F16B 5/0607 |
| 2021/0112772 | A1 * | 4/2021 | Vaccari | F16B 5/0012 |
| 2021/0112773 | A1 * | 4/2021 | Vaccari | A01K 1/0245 |
| 2023/0062592 | A1 * | 3/2023 | Nicholls | A01K 1/032 |

FOREIGN PATENT DOCUMENTS

| | | |
|---|---|---|
| EP | 1234499 A2 | 8/2002 |
| EP | 1614346 A2 | 1/2006 |
| GB | 2183983 A | 6/1987 |

* cited by examiner

*Primary Examiner* — Tien Q Dinh
*Assistant Examiner* — Katelyn T Truong
(74) *Attorney, Agent, or Firm* — FERENCE & ASSOCIATES LLC

(57) ABSTRACT

A cage for pets comprises two lateral metal mesh grid walls with a substantially vertical arrangement, two respectively front and rear metal mesh grid walls, a horizontal upper metal mesh grid wall that forms the roof and a base (36) on a peripheral edge of which said grid walls are fixed, in which the cage further comprises at least one angular coupling element arranged at an upper corner of the cage where a lateral metal mesh grid wall and/or the front metal mesh grid wall and/or the upper metal mesh grid wall join.

9 Claims, 14 Drawing Sheets

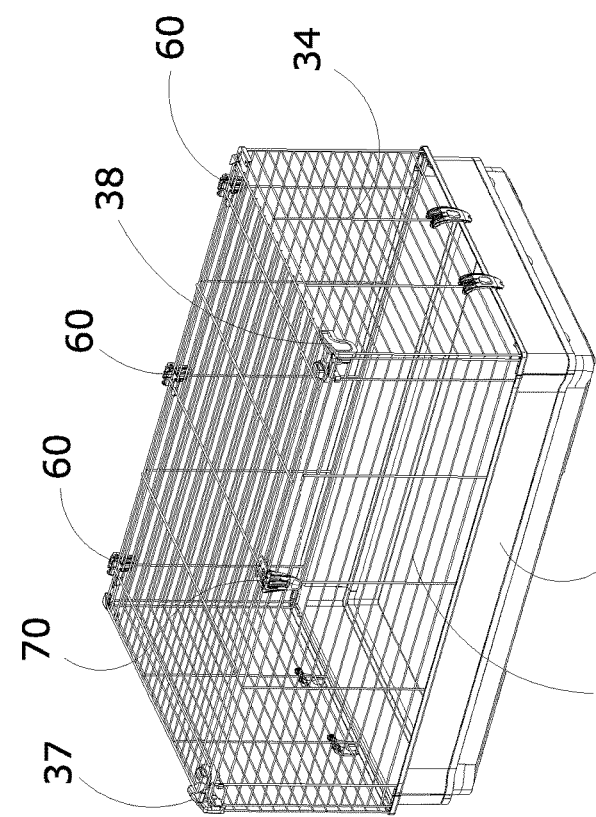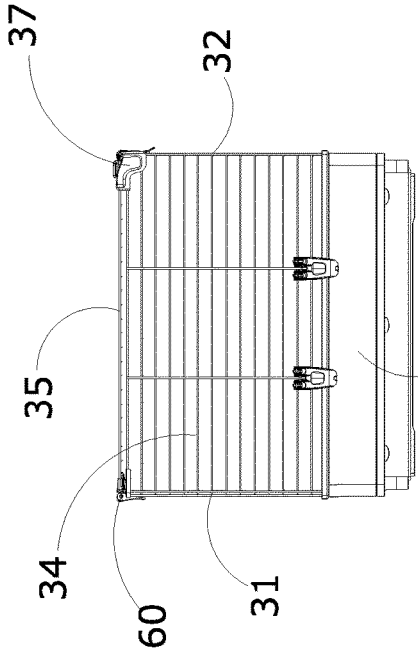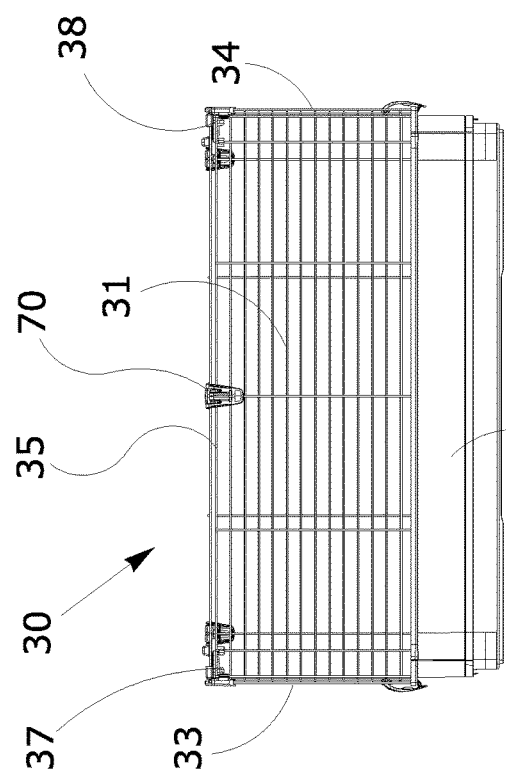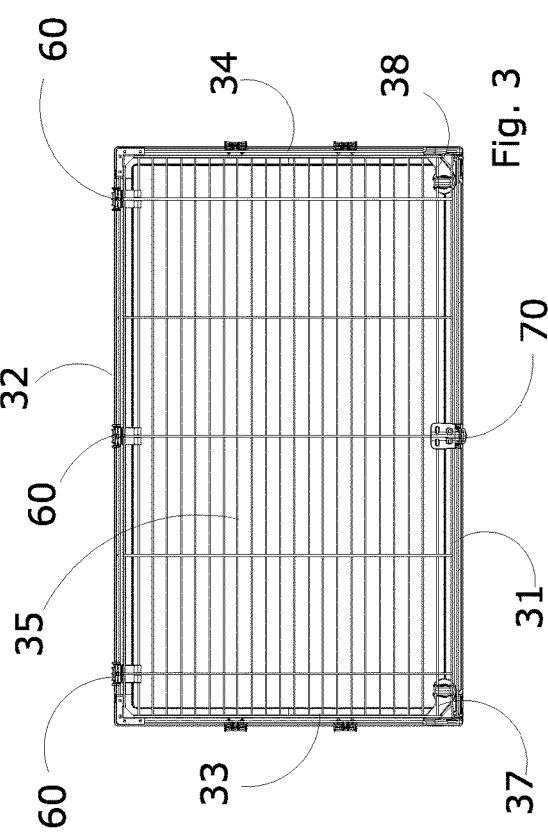

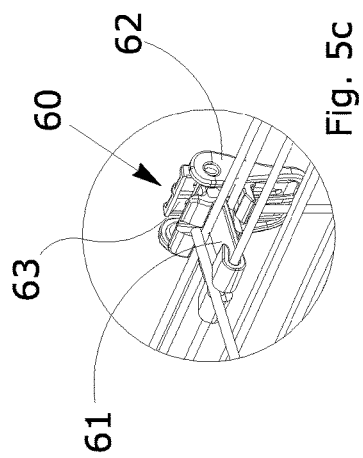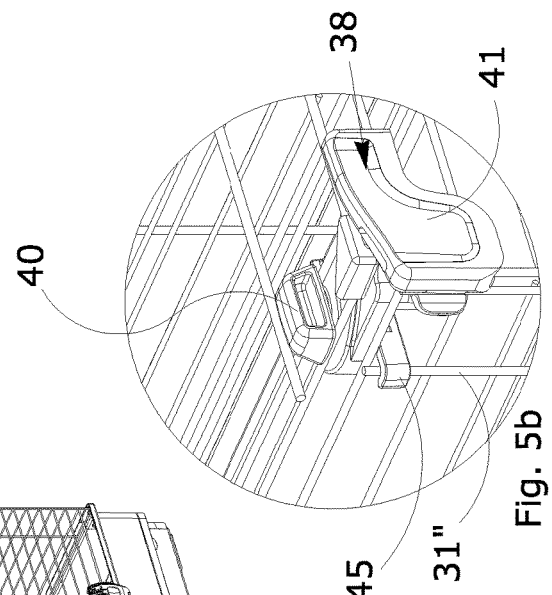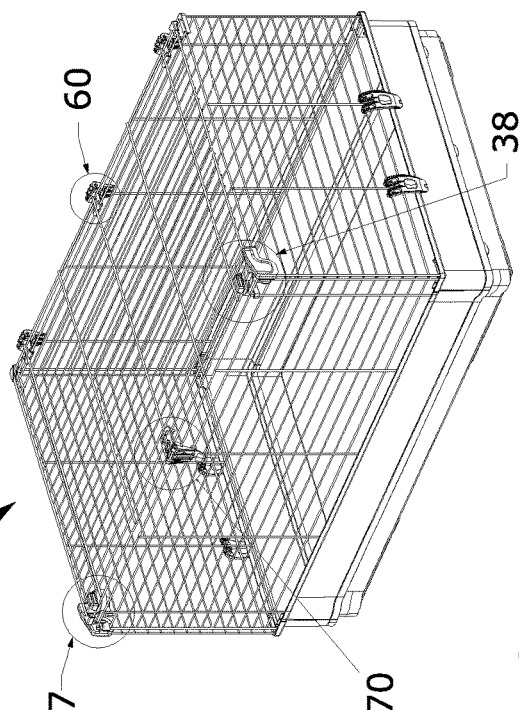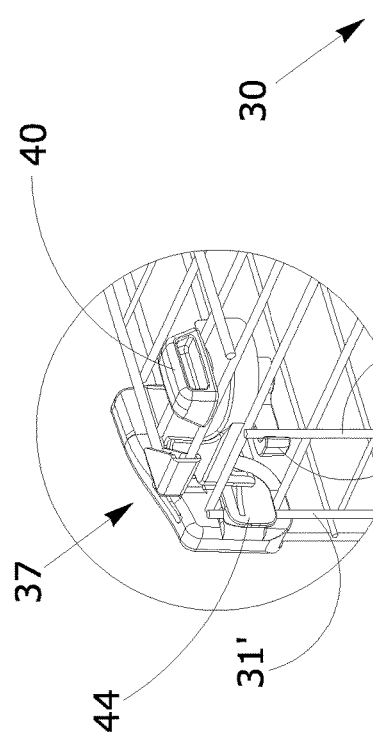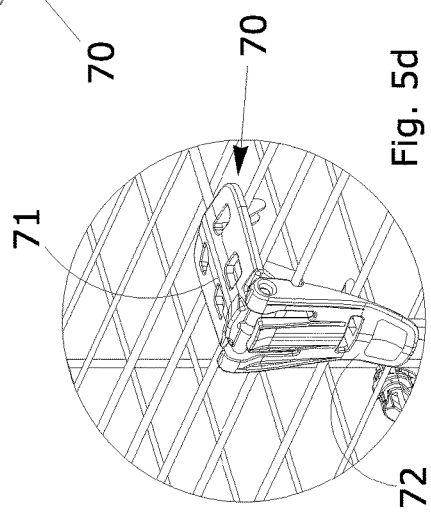

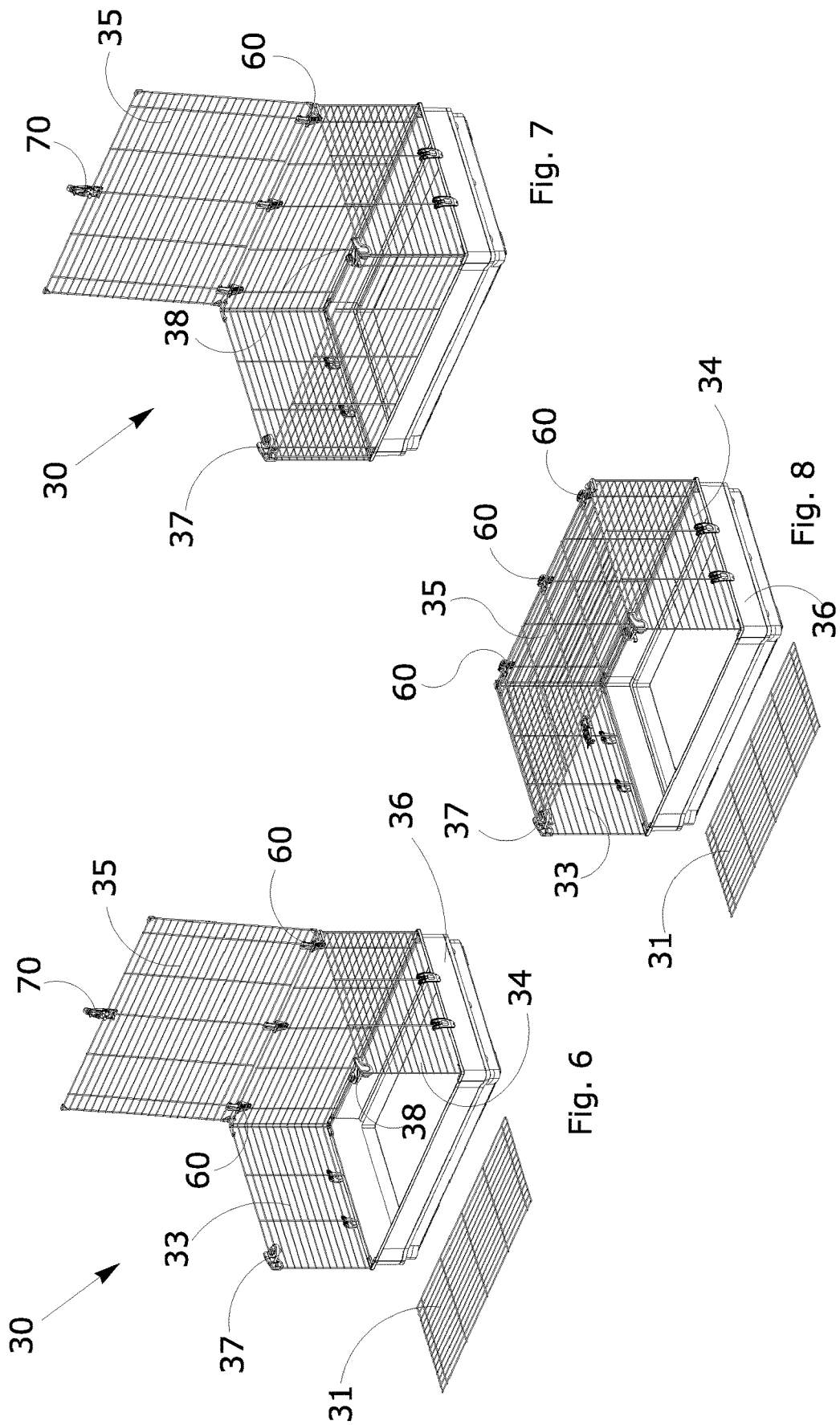

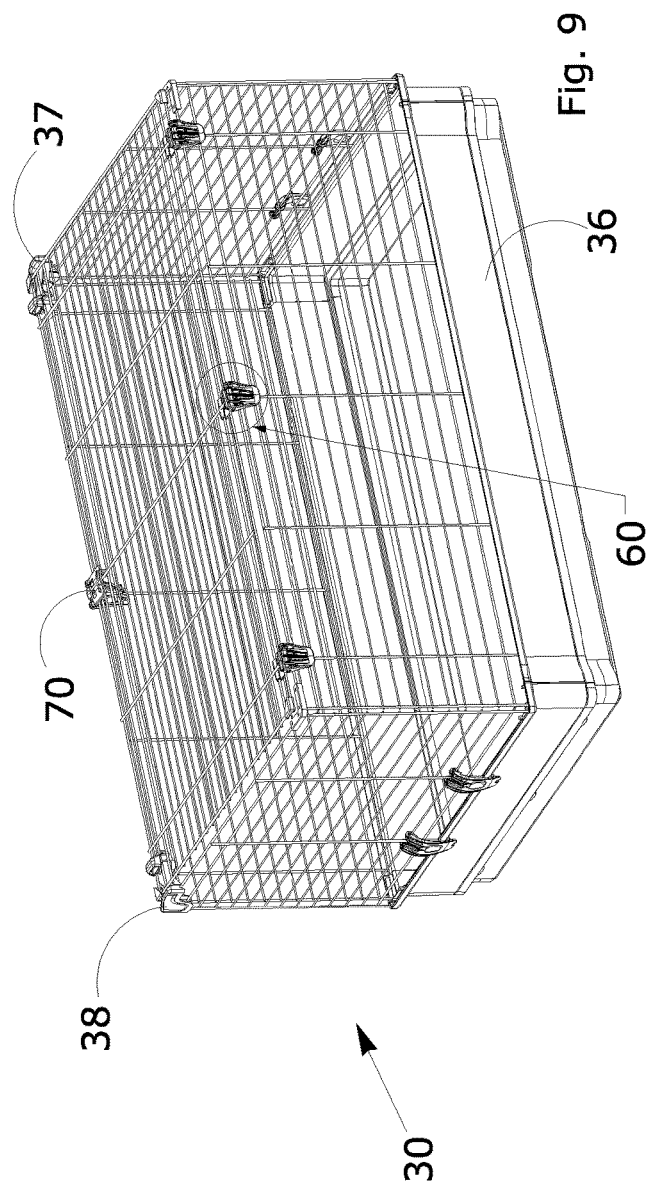
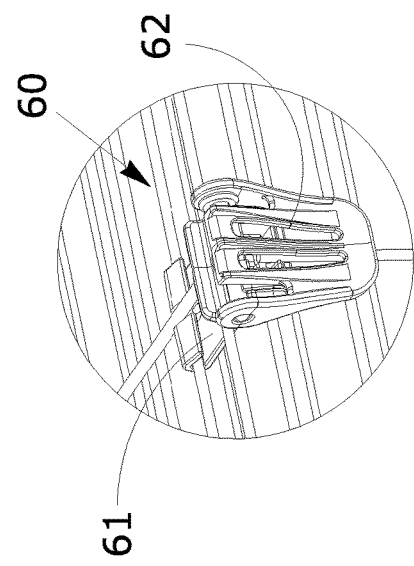
Fig. 9
Fig. 9a

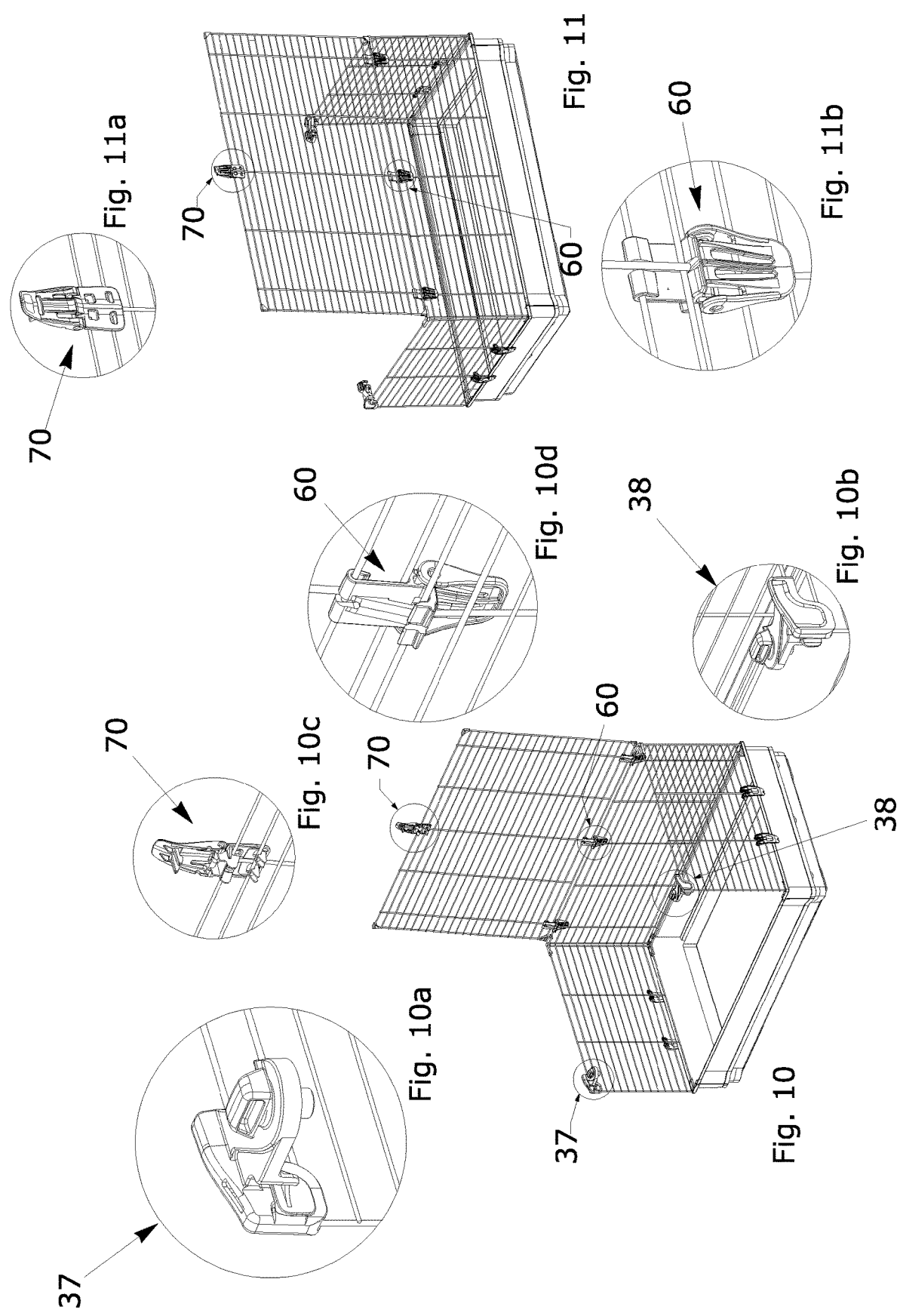

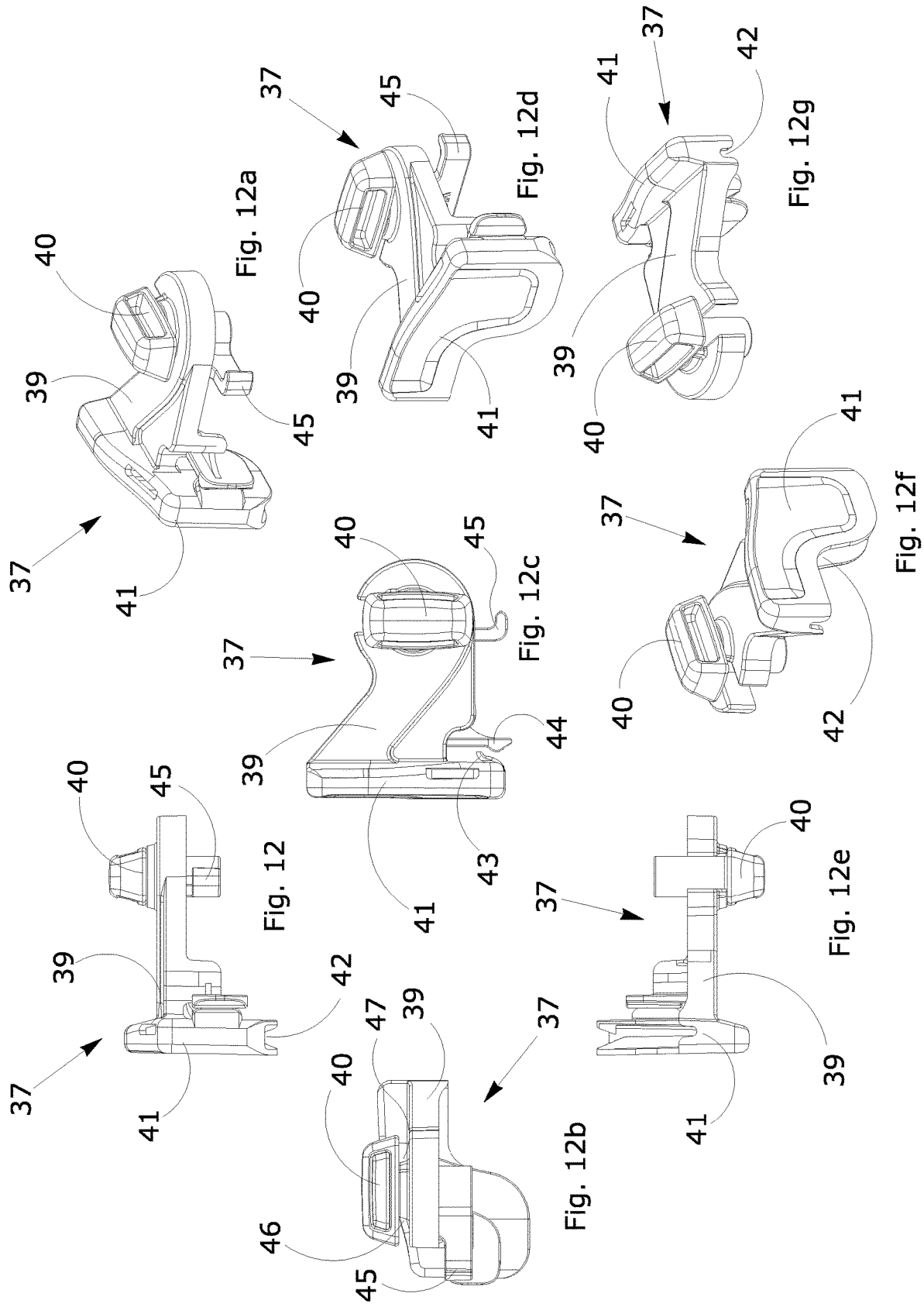

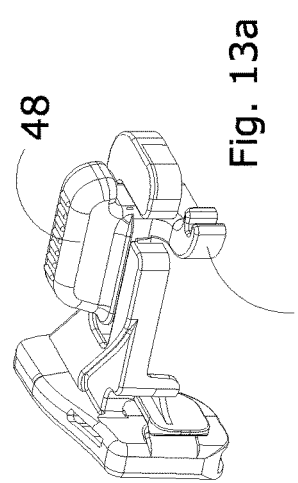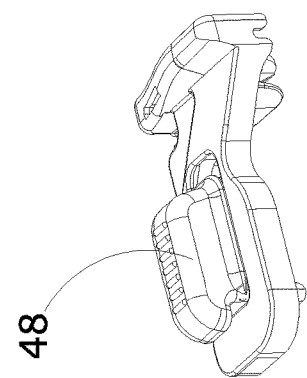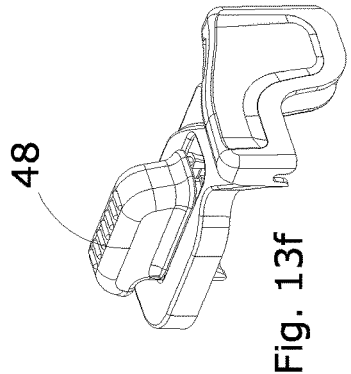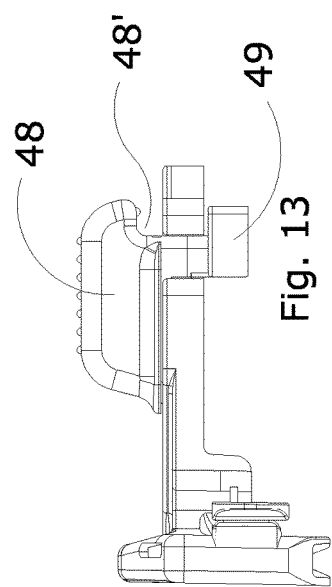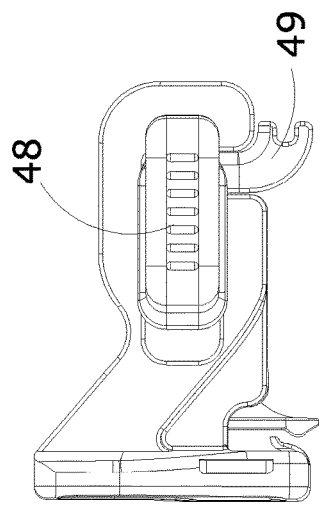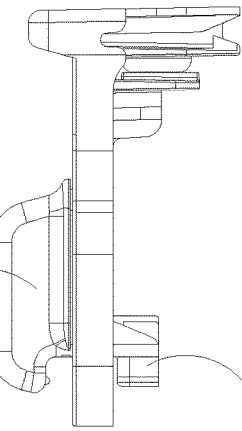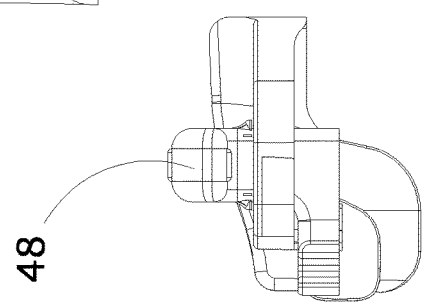

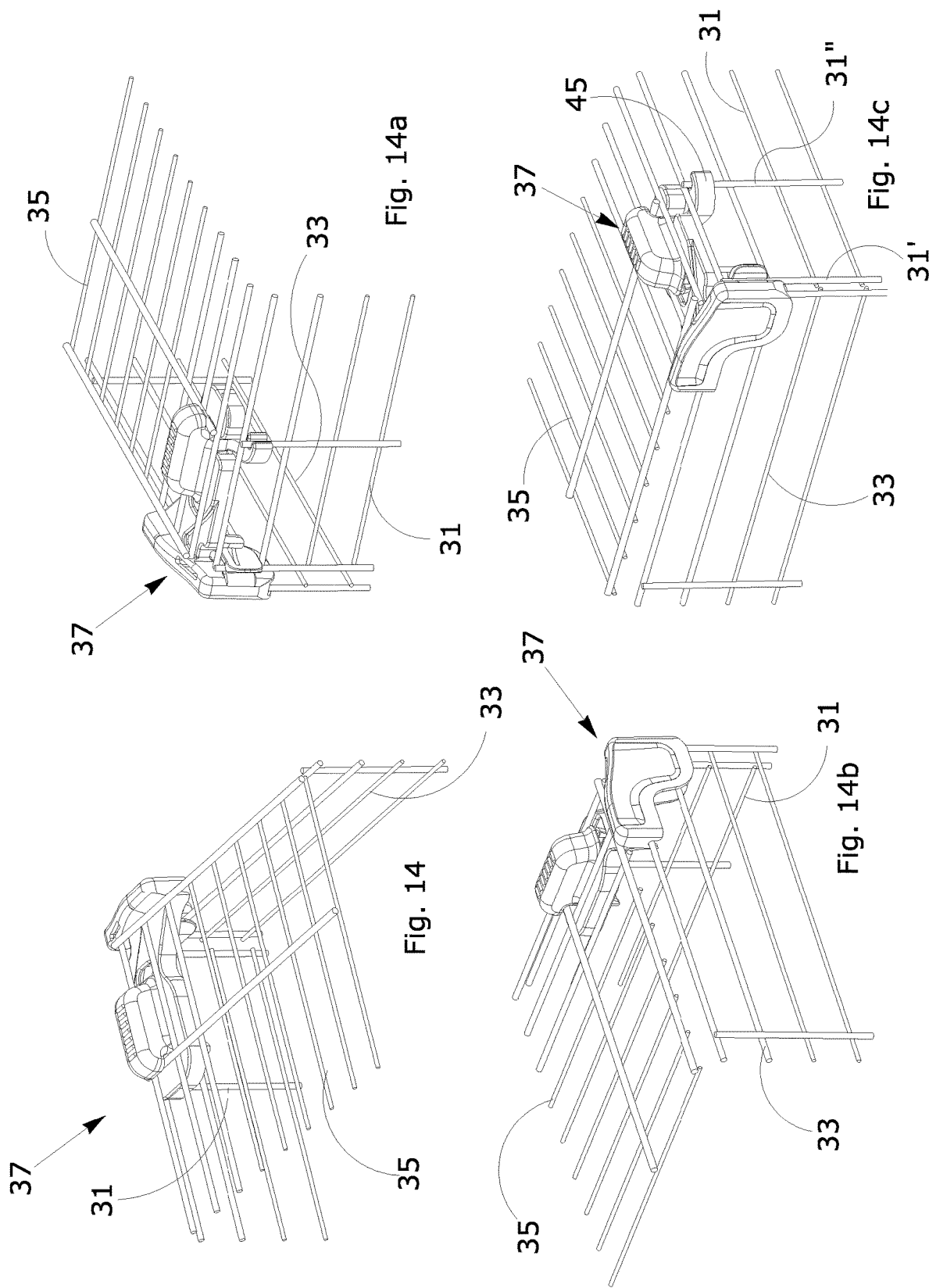

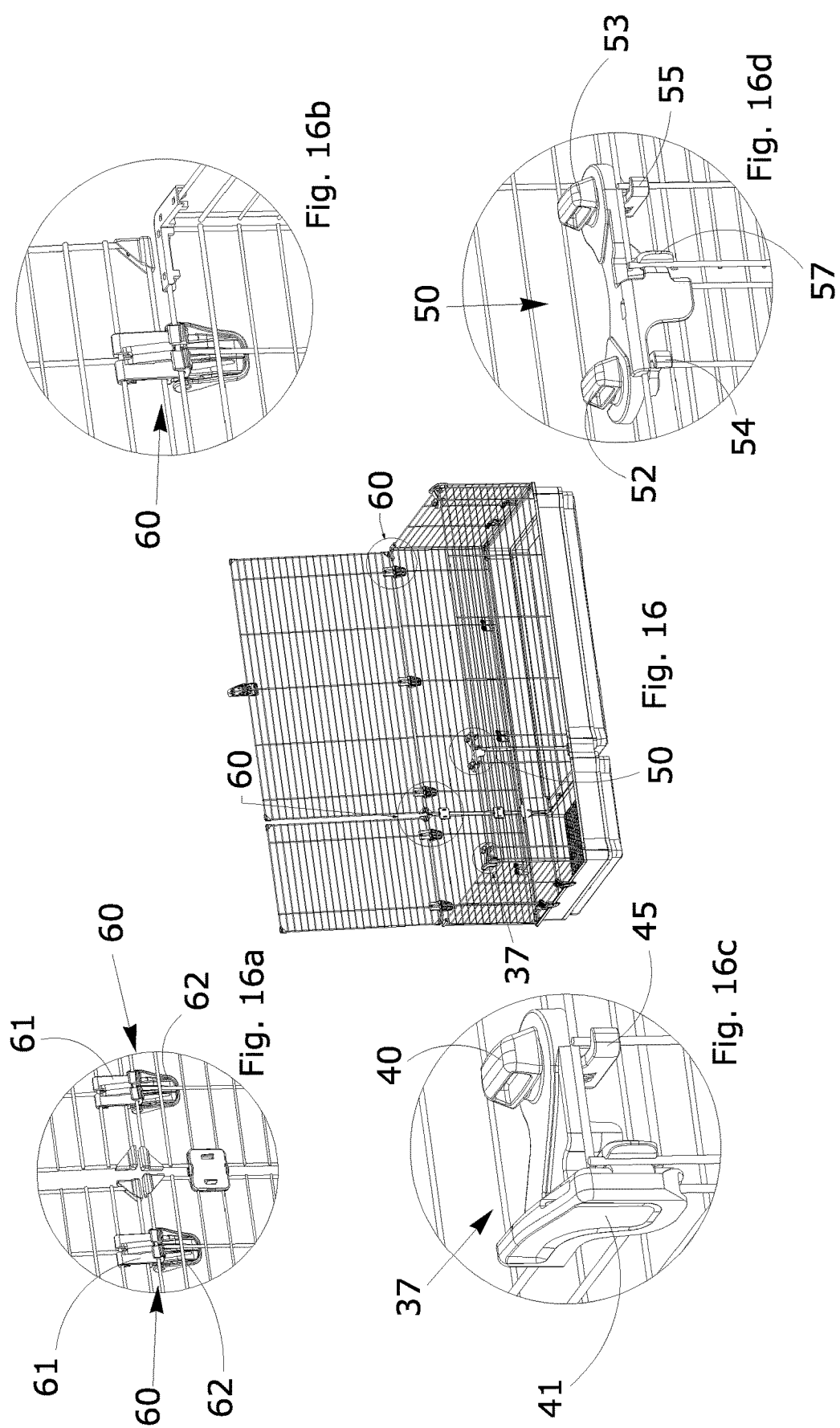

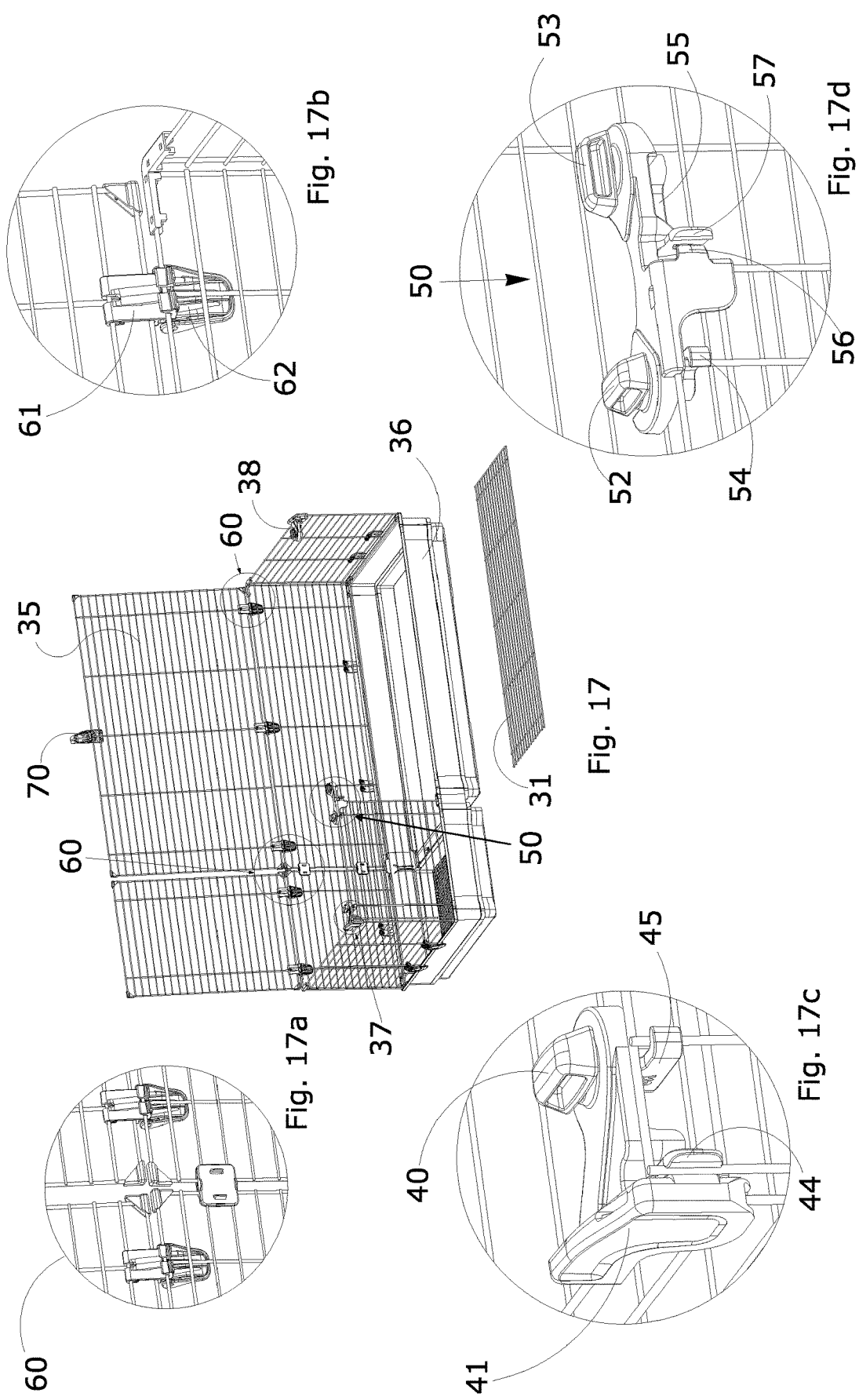

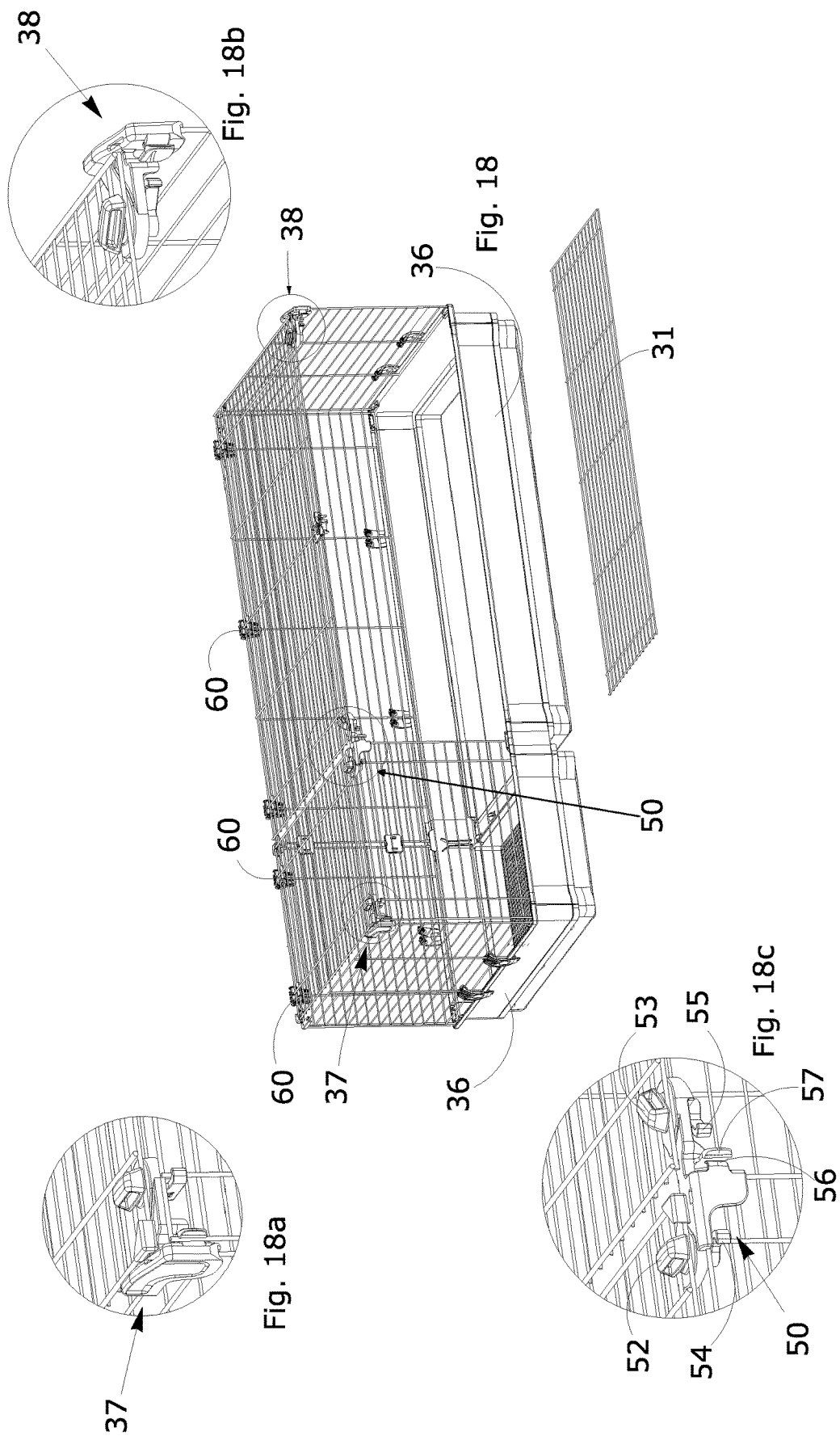

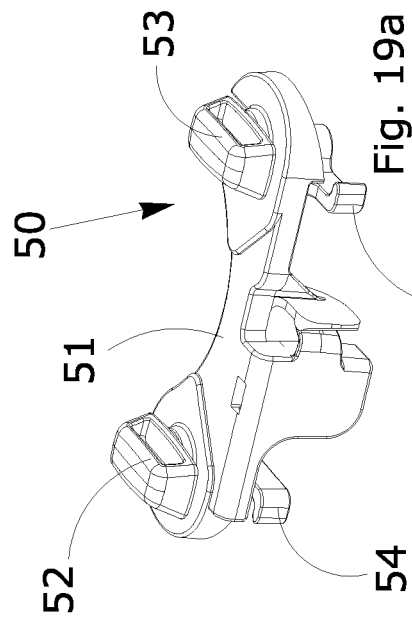
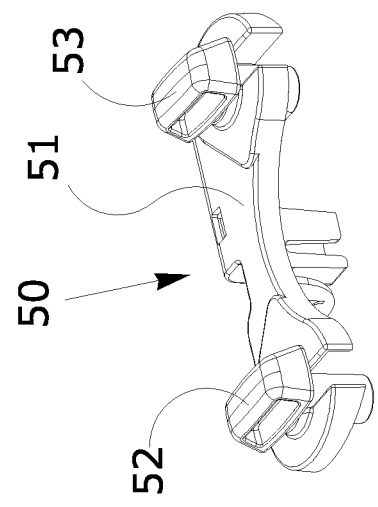
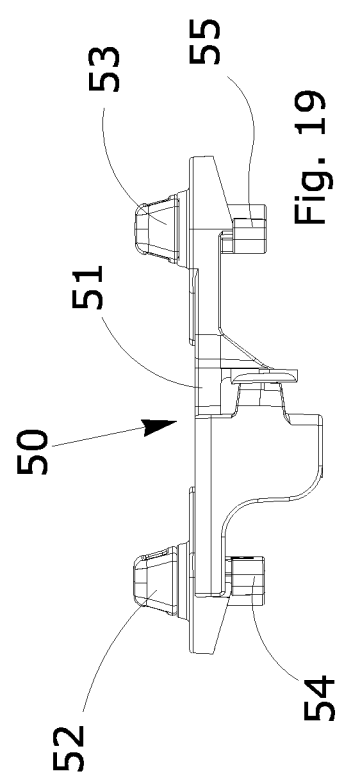
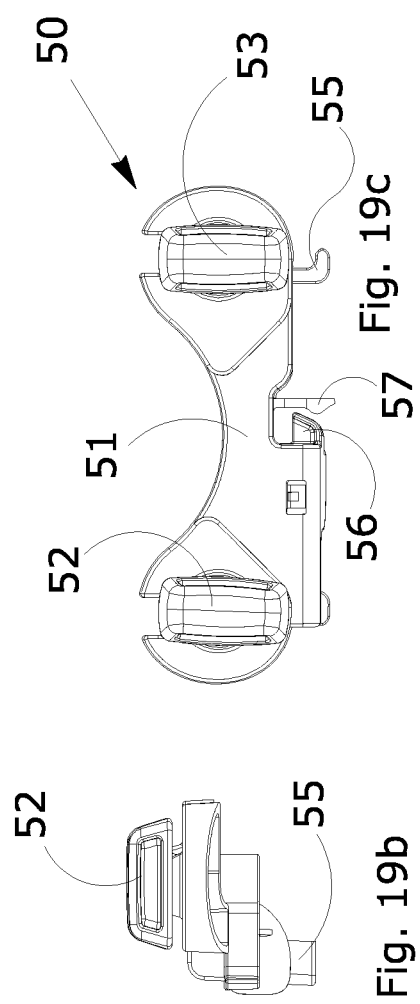
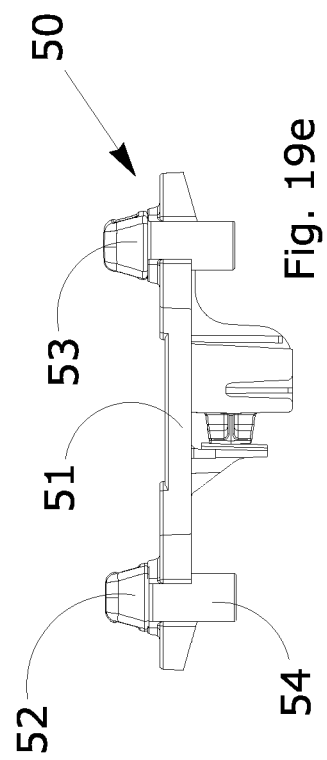

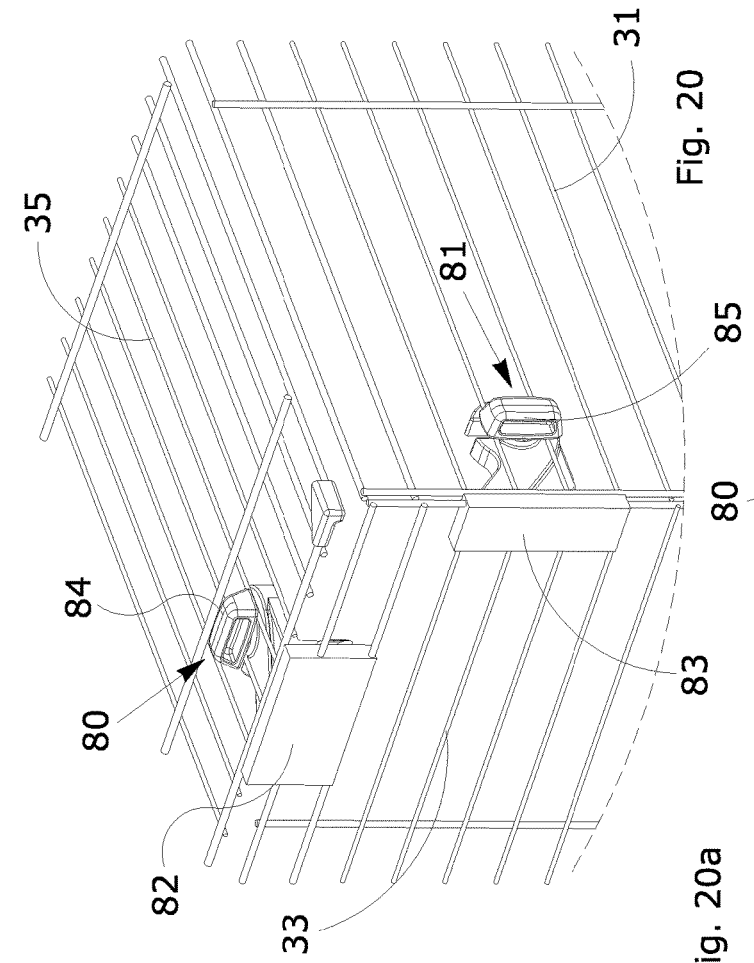
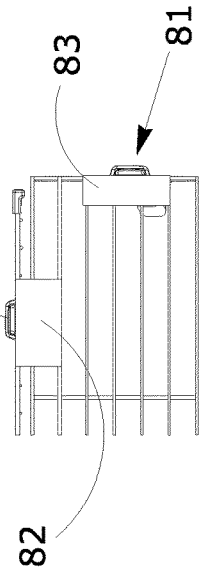
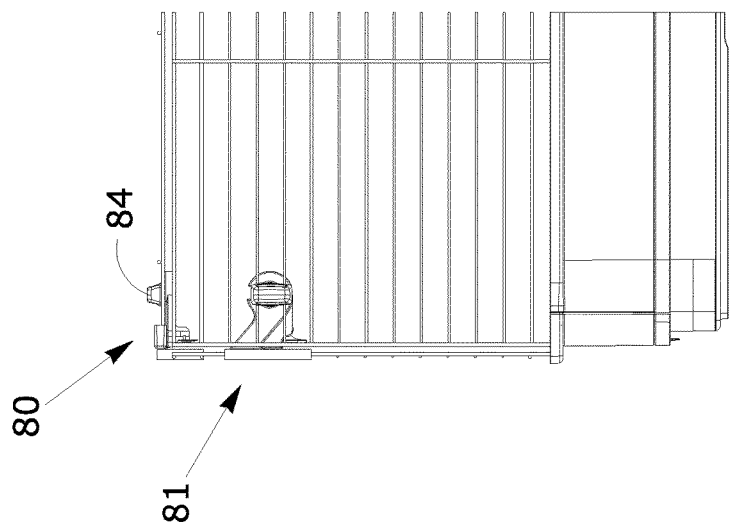

CAGE FOR PETS PROVIDED WITH COUPLING ELEMENTS FOR ASSEMBLING GRID WALLS

CLAIM FOR PRIORITY

This application claims priority to Italian Application No. 102021000007184, which was filed on Mar. 24, 2021, the contents of which are fully incorporated by reference herein.

TECHNICAL FIELD

The present disclosure relates to a cage suitable for containing or conveying pets that is provided with coupling elements for assembling the mesh walls that make up the cage.

The coupling elements with which the cages according to the disclosure are provided enable cages for pets to be obtained that are flexible and modular, i.e., easily adaptable to any dimension of the bottom base, whilst maintaining the special feature of being able to open or remove some walls completely, like the front roof and wall, without the help of made-to-measure doors.

The cage according to the present disclosure is advantageously applied in the sector of components and accessories for pets, in particular in the sector of coupling systems of cages for containing and transporting pets.

BACKGROUND

It is known that cages for containing pets normally consist of a base, a roof and four vertical walls arranged orthogonally side by side. Each of said components is made with different techniques, also on the basis of use, but generally the base is made of plastic material, which is suitable also for containing droppings, whereas the vertical walls, like generally also the roof, are mostly made using grids formed by a plurality of horizontal and vertical metal rods which are spaced so as to form mesh or grid walls which prevent the passage of the contained animal.

The base generally has the shape of a tray placed below and which serves as a basin for the litter, in which it is possible to introduce sandy or granular material which, in addition to absorbing excrement, provides a warm and comfortable environment for the animal.

Traditional grid wall cages can be of the single-compartment type or multiple-compartment type separated by dividers, using internal grid walls which are in turn retained there between through the use of traditional temporary fixing means between adjacent walls.

The cages for pets present on the market and in particular those for rodents, are subject to multiple needs, which have been felt increasingly in recent years, according to which needs of industrial/logistical type have to be met, i.e., have to be sensitive to production needs and to the needs of the user, i.e., the animal and the owner of the animal.

From the industrial/logistical point of view, there is the need for the cages to be simple so as to produce by rapid production cycles, to be dismantlable to reduce transport volumes, maintaining production costs low and production automatable so as to reduce manpower needs.

From the point of view of the user, these cages should be easy to assemble, of large dimensions also for easy accessibility to the inside through openable doors or walls, they should moreover be free of sharp corners, with a great availability of sizes that are easy to clean and have a solid, stable and tough structure.

Some types of product that tried to meet these needs, ignoring all products with welded meshes, i.e., meshes that are not dismantlable because they are now off the market because of the great impact of transport costs, refer in a first case to a dismantlable cage consisting of a bottom base, of rectangular grid walls and a completely openable roof that is also a grid roof.

In this first case, at the upper edge thereof, the vertical walls are held together by a frame that constrains to specific dimensions corresponding to those of the bottom.

A problem encountered during use of this solution relates to the fact that the front wall is not openable and accordingly a small sliding door has necessarily been obtained that is difficult to make because it is not standardized. Further, the assembly of such a cage is not easy and intuitive and the frame interferes with the visibility of the animal.

A second solution provides a cage formed by mesh walls that are close to one another and coupled by the use of slots and folds, whereas they are closable on the bottom by simple hooks.

This solution requires the use of many processes that are not easily automatable, painting is complex because it is necessary to paint all the meshes that have already been assembled together. Further, in this case the roof is not openable and it is necessary to use a door, which significantly affects production costs, man hours and waste of material.

A further solution provides for the structure being formed by vertical walls and a roof made of single and rectangular metal mesh so as to give a rather solid structure held together owing to the use of plastic columns that increase solidity and ensure flexibility in the dimensions.

Nevertheless, these plastic columns complicate assembly by the consumer and increase production costs. Further, the front and upper walls are not openable and it has thus become necessary to add openings provided with grid doors, with resulting complication of the production steps, waste of material and time to be used during production.

According to other solutions present on the market, the mesh walls are kept together by suitable hooks for every single vertical corner, and for the upper edges that are connected to the roof.

Said hooks can be made of metal or plastic material and are adapted to retain two adjacent edges of two walls that are brought near one another orthogonally and, above all in the case of larger cages, several have to be used, both to increase mechanical resistance and to prevent flexure of the front mesh at the center that could create slits or openings that are potentially dangerous for the animal.

Further, using said hooks could enable one of the two adjacent walls of the cage to open through removal of the respective hooks, but this would involve the need to use removable hooks that do not ensure the necessary retention once they have been refitted or the use of coupling elements that make the operations of opening/closing the walls of the cage rather complex and hardly reliable.

BRIEF SUMMARY

The present disclosure aims to provide a means for coupling grid walls of cages for the containment of pets, in particular rodents, said means, because of the particular mechanical features thereof, can be made at extremely low costs and with obvious practical advantages, with the consequent possibility of eliminating or at least reducing the drawbacks described above.

More in particular, the coupling means according to the invention are made by molding thermoplastic material, are thus very simple to make, so as to significantly lower labor costs that rather clearly affect the production of cages and at the same time are able to join simultaneously three mesh walls arranged at 90° to one another, at the contiguous angular corners thereof.

This is obtained by using a coupling means for cages for containing pets, the features of which are disclosed in the main claim.

The dependent claims outline advantageous embodiments.

The main advantages of this solution, in addition to all those that arise from the constructional simplicity thereof, relate above all to being able to make dismantlable cages that permit transport volumes to be reduced to a minimum, but simultaneously simple and cheap production, because the coupling elements are made of thermoplastic material that is simple and easy to make, whereas the walls consist of rectangular elements that do not require the use of special machines, with consequent optimization of painting costs because they are treated in order to be able to make rectangular single walls that are not connected to one another.

According to a further advantage, the coupling elements made of plastic have limited dimensions and therefore have a very limited impact on the visibility of the animal, which can accordingly be observed whilst it moves inside.

Further, such coupling elements according to the invention can be easily produced in plastics with injection molding technology, also in a transparent version, if necessary, i.e., polycarbonate, with a further increase in visibility.

The same coupling elements enable the roof to be able to be opened stably by 100° but leaving the four side walls well fixed so as to contain the animal securely.

Further, the coupling elements enable the front wall to be able to be completely removed, leaving the roof closed or also open, according to need.

The system of making cages according to the invention is independent of the dimension of the bottom and new products can thus be created rapidly, which are even of great dimensions, simply by acting on the size of the various mesh walls of which they are made.

A further advantage are the very limited manufacturing costs because only essential elements are used to make a cage, so for example it is not necessary to use traditional columns or access doors.

The system also lends itself to making products that are modular and extendible and easily and intuitively assemblable by the use of a few items that are easy to fix together.

The features of the plastic material that is used for the coupling components and the possibility of obtaining these components by injection molding are particularly important, thus offering the possibility of creating shapes which are well suited to multiple coupling of the mesh components, accordingly facilitating the wall assembly, dismantling and partial or total opening operations by the end consumer.

Using plastic material for making coupling elements also enables precision to be achieved at the decimal, or even hundredth, level and is simultaneously able to join the corners of even three contiguous walls, which raises the quality level of the product, guaranteeing consistency over the entire production batch.

The coupling components according to the invention further enable the transport volumes and corresponding costs to be reduced because the dismantled walls are superimposable on one another and the joining elements have very reduced dimensions, obtaining maximum reduction of overall dimensions.

The manufacturer's manufacturer is also considerably reduced, with consequent advantages of lower production costs.

BRIEF DESCRIPTION OF THE SEVERAL VIEWS OF THE DRAWINGS

Other features and advantages will become apparent from reading the following description of some embodiments provided by way of non-limiting example, with the aid of the figures illustrated in the appended drawings, in which:

FIGS. 1-4 are respectively axonometric frontal plan and side schematic views of a first embodiment of a cage provided with coupling elements according to an embodiment.

FIGS. 5, 5A, 5B, 5C and 5D show schematic views illustrating a cage according to an embodiment and respective details of angular coupling.

FIGS. 6, 7 and 8 illustrate schematic and axonometric views of some operating conditions of the cage according to an embodiment, respectively with the front wall removed and the roof raised, only the roof raised and only the front removed, depending on the release of some of the coupling elements.

FIGS. 9 and 9A show the axonometric view of a cage according to an embodiment represented by the rear side and the detail of one of the coupling elements.

FIGS. 10, 10A, 10B, 10C and 10D show a cage from which the front grid wall was removed and the roof was opened 100° and the respective details.

FIGS. 11, 11A and 11B illustrate the same operating conditions of a cage shown from the rear side.

FIGS. 12-12G illustrate one of the two specular and symmetrical lateral supports adapted to fixing on the upper and front corner of the side walls and adapted to join the front grid wall and simultaneously the roof of the cage.

FIGS. 13-13F show schematic views of a possible variant of one of the two specular and symmetrical lateral supports adapted to fixing to the upper and front corner of the side walls and adapted to joining the front mesh wall and simultaneously the roof of the cage.

FIGS. 14-14C refer to four views taken from different angles of the lateral support element provided with a sliding selector for joining the corner of three contiguous mesh walls that are at right angles with respect to one another.

FIGS. 16-16D show schematic views of a cage with an extension portion provided with joining elements according to an embodiment and with the roof raised 100°.

FIGS. 17-17D illustrate views of the cage provided with an extension portion provided with the joining elements according to an embodiment and with the roof raised 100° and a removed front wall.

FIGS. 18-18C illustrate schematic views of a cage provided with an extension portion provided with the joining elements according to an embodiment and with only the front wall removed.

FIGS. 19-19E show schematic views of a central support for a cage provided with an extension portion.

FIGS. 20-20C show respectively, in an axonometric, opposite, plan and side perspective, an embodiment in which two coupling elements are used that are applied to the adjacent corners of the same side wall and each comprises temporary coupling means for coupling respectively with the upper wall and the front wall.

DETAILED DESCRIPTION

Figure 15:
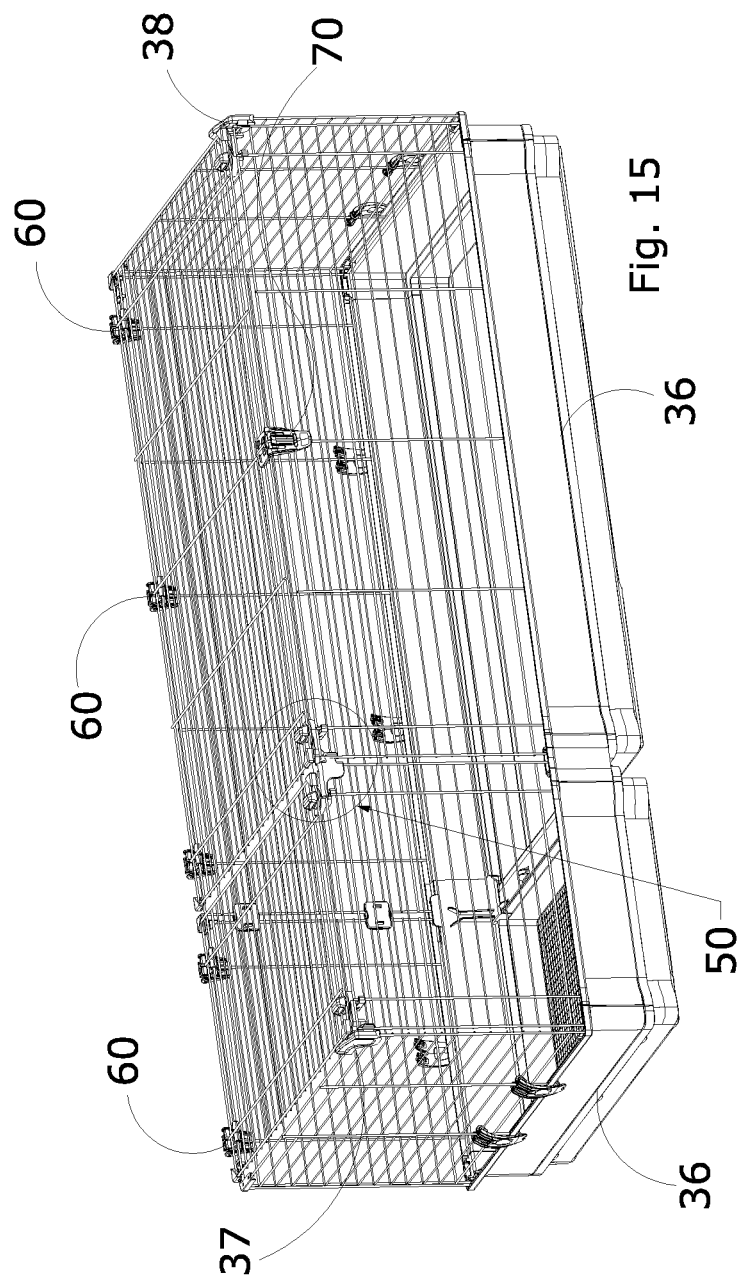
FIGS. 15 and 15A show the schematic view of a cage provided with the coupling elements according to an embodiment where an extension portion has been added that is fixable with the respective joining elements.

With reference to FIG. 1, number 30 indicates overall a cage for pets, in particular rodents, that is made by joining four vertical mesh walls and a horizontal mesh wall, in which each of the walls is obtained by fixing through welding in the crossing points a plurality of parallel rods to other parallel rods arranged at right angles with respect to the other previously mentioned rods.

The components used to make the cage comprise a vertical mesh wall 31 placed on the front side and another corresponding wall 32 placed on the rear side, two side mesh walls 33 and 34, and a horizontal upper metal mesh wall 35 that acts as a roof.

The four vertical walls are located inside a base basin 36 generally made of plastic material adapted to contain possible inert grit or other material for collecting droppings.

According to an embodiment, the mesh walls 31, 32, 33, 34 and the upper wall 35 can be mutually joined and retained in position by coupling elements that enable the angular sectors of the various mutually approached mesh walls to be joined.

The main coupling elements according to an embodiment are those indicated by 37 and 38 in FIGS. 1-4, and are made of thermoplastic material, i.e., by hot injection of melted plastics into a mold, and permit joining between the front and upper corners of the two side walls 33 and 34 with the upper front corners of the front wall 31 and simultaneously with the front corners of the mesh wall 35 that constitutes the roof of the cage.

According to the embodiment shown in FIGS. 1-4, and more in detail in FIGS. 5A and 5B, the coupling elements 37 and 38 are specular and symmetrical to one another and, as visible in yet greater detail in FIGS. 12-12F, the coupling element 37 but similarly also the respective element 38 located on the opposite corner, consists of a plastic angle piece 39 associated with a pawl 40 that is coupled with the upper front corner of the right and left side to retain reciprocally the front upper corners of the side mesh walls 33 and 34, of the front wall 31 and upper wall 35 that acts as a roof.

More precisely the angle piece 39 of the coupling element 37 and of the specular element 38 thereof, according to the embodiment shown in FIGS. 12-12F, comprises a body 41 having a substantially vertical structure adapted to be inserted and fixed on the upper and front angular corner of the side walls 33 and 34 and thus the body 41 is provided with an inner housing 42, consisting of a vertical angular slit having a conformation such as to comprise perfectly the angular corner of the wall 33, as visible in FIGS. 14-14C.

Further, as shown in FIG. 12C, the inner face of the body 41 facing said pawl 40 is provided with a tooth 43 facing an elastic tongue 44, in which said tooth 43 and tongue 44 form a seat with a vertical axis in which the most external vertical rod 31' of the front wall 31 is temporarily housed and fixed, as shown in FIG. 14C.

According to the embodiment shown in FIGS. 12-12F, and in particular in FIG. 12B, the pawl 40 is provided with a handle facing upwards and with a rotation shaft with a vertical axis that protrudes from the angle piece 39 to terminate with a coupling element 45 with an arrangement that is orthogonal to the shaft but with an operating seat with an axis that is parallel to the shaft that intercepts one of the vertical rods of the front mesh wall 31, in particular the first, indicated by 31', as shown in FIG. 14C.

The coupling element 45 is subject to an angular rotation on a vertical axis given by the handle of the pawl 40 so as to adopt two positions arranged at 90° from one another: a release position retracted to the inside of the cage with an arrangement substantially parallel to the front wall 31 and a position constrained on the second rod 31" of the front wall 31, as shown in FIG. 14C, i.e. a coupling arrangement ejected outside.

Further, according to the embodiment shown in FIG. 12B, the handle of the pawl is spaced apart vertically from the horizontal portion of the angle piece 39, so that when the pawl is in a closed position it forms seats 46, 47 in which two more external horizontal rods are retained of the upper wall (35) that acts as a roof of the cage.

In fact, the handle of the pawl has a substantially prismatic rectangular shape that below the two elongated ends forms two equal and opposite undercuts so that in the open position it can enter between the two outer rods of the upper walls forming the roof and after rotation thereof by 90° locks the same two outer rods, retaining the roof in the closed position.

According to a further embodiment shown in FIGS. 13-13F, the rotatable handle of the pawl 40 is replaced by a sliding selector 48 associated with a coupling element 49 similar to the mentioned coupling element 45 and having the same function. In this case, the sliding selector 48, instead of rotating the coupling element 49, enables translation thereof, to move from a release position retracted laterally with respect to the second rod 31" of the front wall 31 to a position constrained on the second rod 31", or a coupling arrangement.

In this case, the handle of the selector 48 ends on one side with a protrusion that determines the formation of a seat 48' shown in FIG. 13 that forms a sort of hook adapted to retain the upper wall 35 that acts as a roof, being inserted, as in the case of the handle of the pawl 40, between two of the parallel rods that form the grid of the upper wall 35 and locking on a transverse rod in order to retain the upper wall when the selector is moved to the locked position.

Both the pawl 40 and the sliding selector 48 have a dual function: whereas the coupling element 37 is positioned and fixed on the front and upper corner of the two vertical side walls 33 and 34, when they are in a closed position they retain both the roof 35 and the front wall 31.

The rotatable pawl 40 can also adopt three positions: a completely closed position in which it locks both the roof 35 and the front mesh 31, a partially closed position in which it locks only the roof 35, leaving the front wall 31 free and one open, in which it leaves both roof 35 and front mesh 31 free.

According to further possible embodiments, the cage usable in the system according to the invention, being of modular type, can increase in volume by approaching one of the sides from which one of the mesh walls has been removed, generally one of the side walls 33 or 34, a further portion or extension, as shown in FIGS. 15, 16, 17 and 18.

Figure 15A:
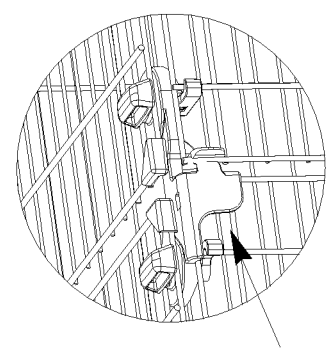

In this case, a bracket 50 shown in FIGS. 15, 15A, 16D, 17D and in the details of FIGS. 19-19E is used to join two consecutive adjacent vertical mesh walls and simultaneously two adjacent consecutive roof portions, maintaining the opening features specified above.

This bracket consists of the junction of two coupling elements 37 disclosed above, or comprises a central body 51 provided with two opposite specular and symmetrical pawls that are each provided with a respective handle and respective shaft at the ends of which that are opposite the handles respective coupling elements 54 and 55 are arranged.

Moreover, at the central portion of the body 51 a tooth 56 is present facing an elastic tongue 57, in which said tooth 56 and tongue 57 form a seat with a vertical axis in which the most external vertical rod 31' is temporarily housed and fixed of the front wall 31 that is placed next to the extension portion.

The cage assembly system for pets according to the present disclosure further involves using two further components.

The first component, shown in FIG. 5, consists of a rear hinge 60, which consists of two parts 61 and 62 that are connected together in an articulated manner that are connected to the roof 35 and to the rear mesh wall 32 and operate as a hinge to constitute an articulated connecting element between the roof and rear wall.

The part 62 of the rear hinge 60 that forms the vertical portion coupled with the rear wall comprises a tooth that cooperates with a respective portion of the part 61, to constitute a limit stop that enables the mesh to remain open according to an indicative angle of 100°, i.e., partially facing backwards with respect to the vertical of the rear mesh wall. The hinge 60 was so extended that if the user forces the roof beyond 100°, the hinges do not break, but open so as to permit reassembling.

A second component is represented by a front hook 70 shown in FIG. 5 and in the detail of FIG. 5D. It is a coupling element consisting of two parts 71 and 72 connected and articulated together, in which the part 71 has a substantially horizontal arrangement and comprises fixing means for fixing to the roof 35 of the cage, whereas the part 72 has an arrangement that is variable from vertical when it is in the position of fixing to the upper edge of the front vertical mesh wall 31, to horizontal when released from the edge.

The front hook 70 has a dual function: when the part 72 is open and raised it acts as a handle to facilitate the opening of the roof 35, whereas when the part 72 is lowered to the closed position it locks the front wall 31 by coupling the front wall 31 with the edge of the roof 35. In this manner a dual problem is solved: the roof 35 is prevented from moving upwards because it is constrained to the front mesh 31 and the roof 35 is prevented from being able to descend or flex downwards because it rests on the front wall 31.

According to the embodiment shown in FIGS. 20-20C, in replacement of coupling elements 37 and 38 that connect the corners of three adjacent walls, two coupling elements 80 and 81 are used, each of which is applied by respective fixing bodies 82 and 83 to the orthogonal adjacent edges placed near the front corners of the side wall 33 or 34 and comprises temporary coupling means 84 and 85 coupling respectively with the upper wall 35 and with the front wall 31.

Said provisional coupling elements 84 and 85 are constituted by a rotatable or sliding pawl, that is able to move from a release position with respect to the upper horizontal wall 35 and to the front wall 31 to a locked position in which the respective handles with which the pawl is provided are coupled by rotation or movement on the rods of the respective upper 35 or front 31 horizontal walls.

As is possible to note, the coupling system disclosed above reaches the important advantageous objectives disclosed and in particular permits opening of the roof 35 in a stable manner at 100°, leaving however the four side walls fixed in place so as to contain the animal securely, and further permits complete removal of the front wall, leaving the roof closed or open, according to need.

What is claimed is:

1. A cage for pets comprising:
   at least four lateral mesh grid walls comprising:
      two side metal mesh grid walls with a substantially vertical arrangement;
      a respectively front metal mesh grid wall; and
      a respectively rear metal mesh grid wall;
   a horizontal upper metal mesh grid wall that forms a roof of the cage, and a base, advantageously made of synthetic material, on a peripheral edge of which each of the at least four lateral metal mesh grid walls are fixed in a substantially vertical arrangement, further comprising;
   at least one angular coupling element arranged at an upper corner of the cage where one of the two side metal mesh grid walls joins with the front metal mesh grid wall and/or the rear metal mesh grid wall and joins with the horizontal upper metal mesh grid wall, wherein said at least one angular coupling element consists of an angular element comprising a first movable portion releasably coupling at least one rod of the horizontal upper metal mesh grid wall, wherein the movable portion is a movable locking element comprising a rotatable pawl that is provided with a handle and with a rotation shaft with a vertical axis that protrudes downwards from the angular element and ends with a coupling element arranged at right angles with respect to a rotation shaft but having an operating seat with an axis parallel to the rotation shaft, and houses one of the vertical rods of the front metal mesh grid wall, and in which said coupling element is rotatable about a vertical axis, given by the handle of the pawl so as to adopt at least two positions:
      a release position retracted to the inside of the cage to adopt an arrangement substantially parallel to the front metal mesh grid wall; and
      a position of constraint on a rod of the front metal mesh grid wall; and
   wherein the angular element comprises a second portion releasably coupling a rod of one of the at least four metal mesh grid walls, wherein the at least one angular element further comprises a body having a substantially vertical arrangement configured to be coupled onto and fixed at least to the upper corner and/or a front corner of one of the at least two side metal mesh grid walls, the body being provided with a housing having a conformation that includes the corner of the respective one of the at least two side metal mesh grid walls, thereby making a temporary and releasable coupling between the front corner and/or the upper corner.

2. The cage of claim 1, wherein an inner face of said body facing the movable locking element is provided with a tooth facing an elastic tongue, wherein the tooth and the tongue form a seat having a vertical axis in which the most external vertical rod of the front metal mesh grid wall is temporarily and releasably housed and fixed.

3. The cage according to claim 1 wherein the handle of the pawl is spaced apart in a vertical direction from a horizontal portion of the angular element, so that when the pawl is in the closed position it forms seats in which two more external horizontal rods of the horizontal upper metal mesh grid wall are retained, and wherein the handle of the pawl has a substantially prismatic rectangular shape that below two elongated ends forms two equal and opposite undercuts such that in the open position the handle can enter between the two external rods of the horizontal upper metal mesh grid wall, and after a rotation thereof by 90° comes to lock the two external rods, thereby retaining the horizontal upper metal mesh grid wall in a closed position.

4. The cage according to claim 1, further comprising: at least one hinge consisting of two parts connected together to connect the horizontal upper metal mesh grid wall to one of the at least four lateral mesh grid walls, in which one of the parts of the at least one hinge, which forms the vertical portion coupled to the horizontal upper mesh grid wall, comprises a tooth that operates with a respective protrusion of the other of the two parts of the at least one hinge, said at least one hinge enabling the horizontal upper metal mesh grid wall to be opened and to be positioned up to a preset angle.

5. The cage according to claim 1, further comprising at least one hook consisting of two parts connected and articulated together, in which a first part of the at least one hook has a substantially horizontal arrangement and comprises fixing means for fixing to the horizontal upper metal mesh grid wall, wherein a second part of the at least one hook comprises coupling elements for temporary coupling to the front metal mesh grid wall to move from a fixing position between the horizontal upper metal mesh grid wall and the upper edge of the front metal mesh grid wall to a release position for the horizontal upper metal mesh grid wall.

6. The cage according to claim 5, wherein said at least one hook is configured to move from an open position, in which the second part of the at least one hook acts as a handle to facilitate opening of the horizontal upper metal mesh grid wall, to a closed position when the second part is lowered to lock the front metal mesh grid wall by connecting the front metal mesh grid wall to the edge of the horizontal upper metal mesh grid wall.

7. The cage according to claim 1, further comprising at least one bracket adapted to join additional cage modules, or for the connection between two vertical consecutive flanked metal mesh grid walls and simultaneously of two consecutive flanked portions of horizontal upper metal mesh grid walls, said bracket consisting of a central body provided with two opposite specular and symmetrical pawls each provided with a respective handle comprising seats for coupling to the joined horizontal upper metal mesh grid walls and respective shaft with a vertical axis at the ends of which opposite to the handles respective coupling elements are arranged for the temporary retention of respective vertical rods of the front metal mesh grid walls.

8. The cage according to claim 7, wherein at the central portion of said body the bracket comprises a tooth facing an elastic tongue, in which the tooth and the elastic tongue form a seat with a vertical axis in which one of the vertical rods of the front metal mesh grid wall placed next to the extension portion is temporarily housed and fixed.

9. A cage for pets comprising:
at least four lateral mesh grid walls comprising:
two side metal mesh grid walls with a substantially vertical arrangement;
a respectively front metal mesh grid wall; and
a respectively rear metal mesh grid wall;
a horizontal upper metal mesh grid wall that forms a roof of the cage, and a base, advantageously made of synthetic material, on a peripheral edge of which each of the at least four lateral metal mesh grid walls are fixed in a substantially vertical arrangement, further comprising;
at least one angular coupling element arranged at an upper corner of the cage where one of the two side metal mesh grid walls joins with the front metal mesh grid wall and/or the rear metal mesh grid wall and joins with the horizontal upper metal mesh grid wall, wherein said at least one angular coupling element consists of an angular element comprising a first movable portion releasably coupling at least one rod of the horizontal upper metal mesh grid wall, wherein the movable portion comprises a movable locking element and wherein the movable locking element comprises a sliding selector provided with a handle associated with a coupling component, and wherein the sliding selector is movable from a release position retracted laterally with respect to a rod of the front metal mesh grid wall to a position of constraint on the rod, or a position of coupling with the rod, wherein the handle of the sliding selector ends on one side with a protrusion that determines the formation of a seat that forms a hook adapted to retain the horizontal upper metal mesh grid wall, being inserted between two of the parallel rods the form the grid of one of the least four lateral mesh grid walls and getting locked on a transverse rod in order to retain the one of the at least four lateral mesh grid walls when the selector is moved to the locked position;
wherein the angular element comprises a second portion releasably coupling a rod of one of the at least four metal mesh grid walls, wherein the at least one angular element further comprises a body having a substantially vertical arrangement configured to be coupled onto and fixed at least to the upper corner and/or a front corner of one of the at least two side metal mesh grid walls, the body being provided with a housing having a conformation that includes the corner of the respective one of the at least two side metal mesh grid walls, thereby making a temporary and releasable coupling between the front corner and/or the upper corner.

* * * * *